United States Patent
Cao

(10) Patent No.: US 8,607,101 B2
(45) Date of Patent: Dec. 10, 2013

(54) RS-485 PORT TEST APPARATUS

(75) Inventor: Zhao-Jie Cao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 421 days.

(21) Appl. No.: 12/836,573

(22) Filed: Jul. 14, 2010

(65) Prior Publication Data
US 2011/0320871 A1  Dec. 29, 2011

(30) Foreign Application Priority Data

Jun. 23, 2010 (CN) .......................... 2010 1 0207356

(51) Int. Cl.
*G06F 11/00* (2006.01)
(52) U.S. Cl.
USPC ........................................................... 714/44
(58) Field of Classification Search
USPC .................................... 714/30, 44
See application file for complete search history.

(56) References Cited

U.S. PATENT DOCUMENTS

| | | | |
|---|---|---|---|
| 4,810,958 A * | 3/1989 | Mogi et al. ..................... | 702/118 |
| 5,148,435 A * | 9/1992 | Ray et al. ....................... | 714/716 |
| 2002/0059479 A1* | 5/2002 | Hardy et al. ...................... | 710/1 |
| 2003/0137694 A1* | 7/2003 | Tomidokoro ................ | 358/1.15 |
| 2005/0114576 A1* | 5/2005 | Romero et al. ............... | 710/100 |

* cited by examiner

*Primary Examiner* — Yair Leibovich
(74) *Attorney, Agent, or Firm* — Altis Law Group, Inc.

(57) ABSTRACT

An RS-485 port test apparatus includes an RS-485 connector, a micro control unit (MCU), a multiprotocol transceiver, and a display. The RS-485 connector receives a first test code signal from a test RS-485 port of an electronic device. The multiprotocol transceiver receives the first test code signal from the RS-485 connector, converts the first test code signal to a second test code signal which can be identified by the MCU, and transmits the second signal to the MCU. The MCU receives the second test code signal and displays the second test code signal by the display. The MCU sends back the second test code signal to the multiprotocol transceiver. The multiprotocol transceiver converts the second test code signal to the first test code and transmits the first test code to the test RS-485 port of the electronic device through the RS-485 connector.

5 Claims, 1 Drawing Sheet

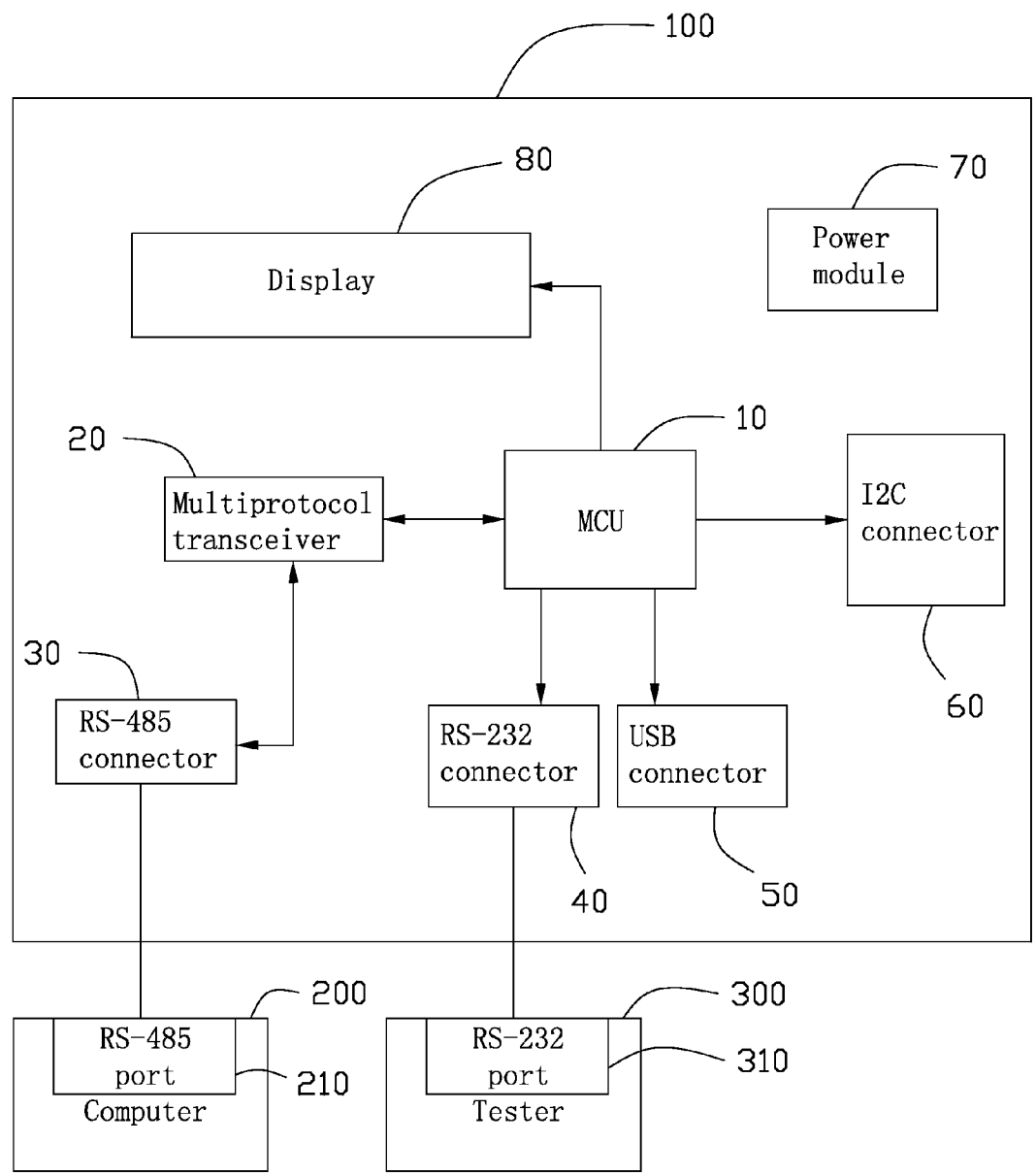

RS-485 PORT TEST APPARATUS

BACKGROUND

1. Technical Field

The present disclosure relates to a test apparatus to test RS-485 ports of electronic devices.

2. Description of Related Art

In telecommunications, RS-485 ports are widely used in many electronic devices, such as computers and printers. After manufacturing but before shipping, most, if not all, of these RS-485 ports are tested. A common method to test an RS-485 port is to use RS-485 communication apparatus to test the RS-485 port. For example, when an RS-485 port of a computer needs to be tested, a printer using an RS-485 port as its communicating means is connected to the RS-485 port of the computer. If the printer can be controlled by the computer normally, this means the RS-485 port of the computer is ok. However, the need for extra RS-485 apparatuses, such as the printer, to perform the tests, may increase costs.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawings, the view is schematic.

The FIGURE is a circuit block diagram of an embodiment of an RS-485 port test apparatus, together with a computer and a tester.

DETAILED DESCRIPTION

The disclosure, including the accompanying drawing in which like references indicate similar elements, is illustrated by way of example and not by way of limitation. It should be noted that references to "an" or "one" embodiment in this disclosure are not necessarily to the same embodiment, and such references mean at least one.

Referring to the drawing, an embodiment of an RS-485 port test apparatus 100 includes a micro control unit (MCU) 10, a multiprotocol transceiver 20, an RS-485 connector 30, an RS-232 connector 40, a universal serial bus (USB) 50, an inter-integrated circuit (I2C) connector 60, a power module 70, and a display 80. In one embodiment, the multiprotocol transceiver 20 is MAX3160E.

The RS-485 connector 30 is connected to the MCU 10 through the multiprotocol transceiver 20. The MCU 10 is also connected to the RS-232 connector 40, the USB connector 50, the I2C connector 60, and the display 80. The power module 70 is used to supply power to the RS-485 port test apparatus 100 (the connection relationship between the power module 70 and the other elements are not shown). The multiprotocol transceiver 20 is used to receive first signals from the RS-485 connector 30, and convert the first signals to second signals which can be identified by the MCU 10, and then transmit the second signals to the MCU 10. The MCU 10 is used to receive the second signals and send the second signals to the display 80 to be displayed. The MCU 10 may also be used to transmit the second signals to other external devices through the RS-232 connector 40, the USB connector 50, and the I2C connector 60. For example, an external tester 300 receives the second signals through an RS-232 port 310 thereof connecting to the RS-232 connector 40.

When an RS-485 port 210 of a computer 200 needs to be tested, the RS-485 port 210 of the computer 200 is connected to the RS-485 connector 30 of the RS-485 port test apparatus 100. The computer 200 sends a first test code signal to the multiprotocol transceiver 20 through the RS-485 connector 30. The multiprotocol transceiver 20 converts the first test code signal to a second test code signal which can be identified by the MCU 10, and then transmits the second test code signal to the MCU 10. The MCU 10 receives the second test code signal and displays the second test code signal by the display 80. If the first test code signal is "100" and the displayed second test code signal on the display 80 is also "100", this means the transmitting function of the RS-485 port 210 of the computer 200 is ok. To test the receiving function, the MCU 10 transmits the second test code signal back to the multiprotocol transceiver 20. The multiprotocol transceiver 20 converts the second test code signal to the first test code signal, and then transmits the first code signal to the computer 210 through the RS-485 connector 30 and the RS-485 port 210. If the return first code signal is equal to the initial first code signal, this means the receiving function of the RS-485 port 210 of the computer 200 is also ok.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An RS-485 port test apparatus comprising:
    an RS-485 connector to receive a first test code signal from a test RS-485 port of an electronic device;
    a micro control unit (MCU);
    a multiprotocol transceiver to receive the first test code signal from the RS-485 connector, convert the first test code signal to a second test code signal which can be identified by the MCU, and transmit the second signal to the MCU; and
    a display connected to the MCU, wherein the MCU receives the second test code signal and displays the second test code signal by the display to compare with the first test code signal; the MCU sends back the second test code signal to the multiprotocol transceiver, the multiprotocol transceiver converts the second test code signal to the first test code and transmits the first test code to the test RS-485 port of the electronic device through the RS-485 connector.

2. The RS-485 port test apparatus of claim 1, further comprising at least one transmitting connector connected to the MCU, the MCU transmitting the second test code signal to at least one external extra devices through the at least one transmitting connector.

3. The RS-485 port test apparatus of claim 2, wherein the at least one transmitting connector comprises one or more of RS-232 connectors, universal serial bus (USB) connectors, and inter-integrated circuit (I2C) connectors.

4. The RS-485 port test apparatus of claim 1, wherein a transmitting function of the test RS-485 port of the electronic device is enabled, if a first content of the first test code signal transmitted from the test RS-485 port of the electronic device is the same as a second content of the second test code signal received by the MCU.

5. The RS-485 port test apparatus of claim 1, wherein a receiving function of the test RS-485 port of the electronic device is determined as ok if a first content of the first test code signal received by the test RS-485 port of the electronic device is the same as a second content of the second test code signal received by the MCU.

* * * * *